(12) United States Patent
Mansuino

(10) Patent No.: US 11,806,811 B2
(45) Date of Patent: Nov. 7, 2023

(54) METHOD FOR PRODUCING A SHAPED SHEET OF WRAPPING

(71) Applicant: SOREMARTEC S.A., Senningerberg (LU)

(72) Inventor: Sergio Mansuino, Castiglione Falletto (IT)

(73) Assignee: SOREMARTEC S.A., Senningerberg (LU)

( * ) Notice: Subject to any disclaimer, the term of this patent is extended or adjusted under 35 U.S.C. 154(b) by 139 days.

(21) Appl. No.: 17/115,172

(22) Filed: Dec. 8, 2020

(65) Prior Publication Data

US 2021/0197321 A1 Jul. 1, 2021

(30) Foreign Application Priority Data

Dec. 30, 2019 (LU) .......................... 101585

(51) Int. Cl.
 *B23K 26/40* (2014.01)
 *B23K 26/38* (2014.01)
 *B23K 103/00* (2006.01)

(52) U.S. Cl.
 CPC .............. *B23K 26/40* (2013.01); *B23K 26/38* (2013.01); *B23K 2103/50* (2018.08)

(58) Field of Classification Search
 CPC ...... B29C 51/082; B23K 26/40; B23K 26/38; B23K 2103/50
 USPC ............ 219/121.72, 730, 728; 156/247, 252, 156/245, 2.2, 212, 224; 428/131; 206/564, 524.4; 83/684; 426/107, 114, 426/65 B, 43, 26
 See application file for complete search history.

(56) References Cited

U.S. PATENT DOCUMENTS

| | | | | |
|---|---|---|---|---|
| 6,255,621 | B1* | 7/2001 | Lundquist .............. | G11B 5/102 219/121.72 |
| 2008/0052173 | A1* | 2/2008 | Liou ..................... | G06Q 50/12 705/15 |
| 2008/0230176 | A1* | 9/2008 | Van De Weijer ...... | B65D 65/40 219/121.72 |
| 2018/0132520 | A1* | 5/2018 | Ellison ................. | A23G 7/0018 |
| 2021/0308800 | A1* | 10/2021 | Funaoka .............. | B23K 26/147 |

OTHER PUBLICATIONS

Jedrkiewicz Ottavia , EP 3335826 A1 (Year: 2018).*

* cited by examiner

*Primary Examiner* — Tu B Hoang
*Assistant Examiner* — Vy T Nguyen
(74) *Attorney, Agent, or Firm* — ROTHWELL, FIGG, ERNST & MANBECK, P.C.

(57) ABSTRACT

A method for producing a shaped sheet of wrapping, including a hollow portion and a perimetral edge that extends along a pre-set profile, is provided. The method includes laying a sheet of wrapping on a treatment surface having a forming cavity. The method includes forming the sheet of wrapping within the forming cavity so as to reproduce the shape of the hollow portion thereon, without subjecting the sheet of wrapping to deformation by stretching. The method includes cutting the formed sheet of wrapping along the pre-set profile for producing the perimetral edge and obtaining the shaped sheet of wrapping. In the method, the cutting step envisages the use of a laser beam according to a particular cutting mode.

16 Claims, 4 Drawing Sheets

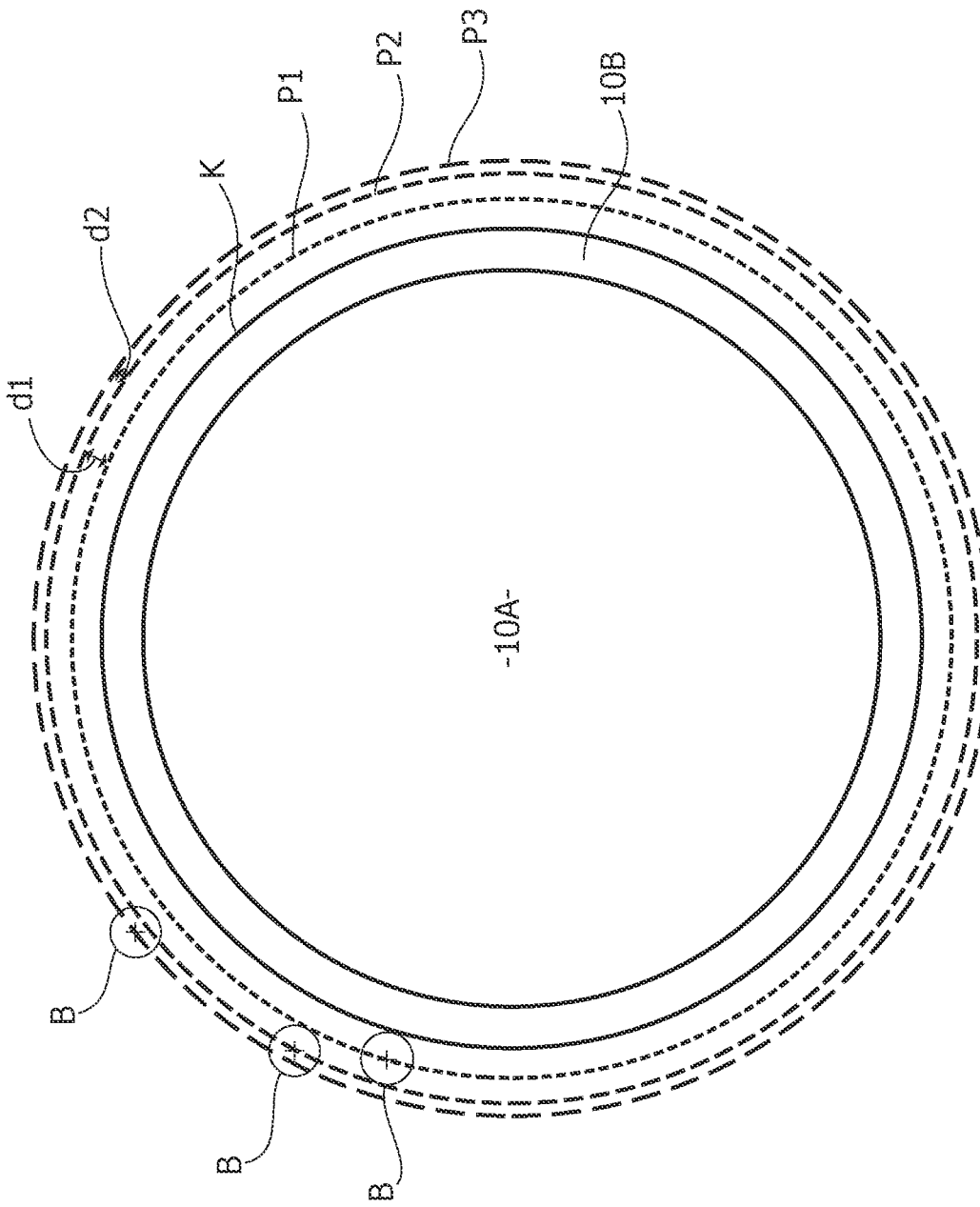

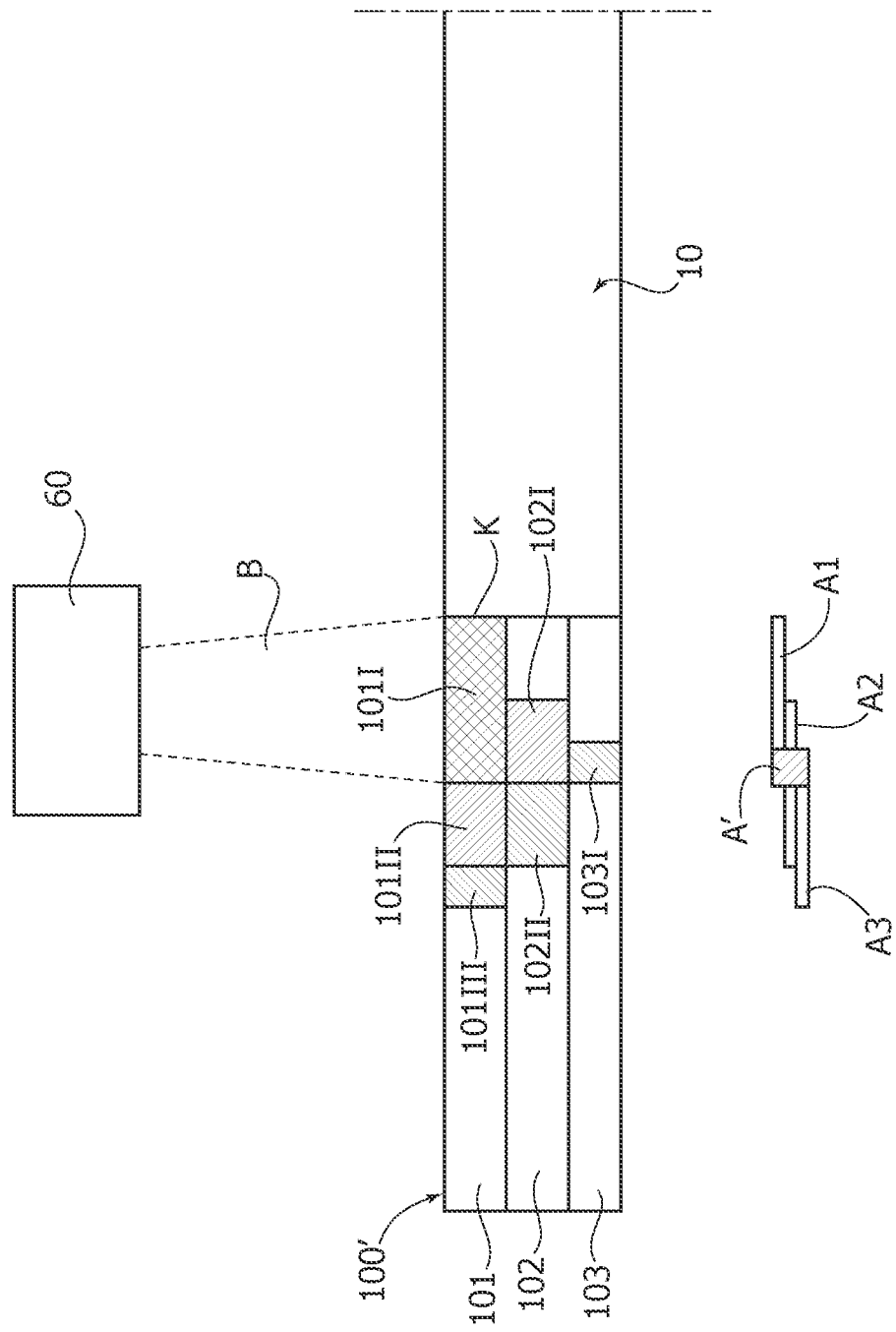

METHOD FOR PRODUCING A SHAPED SHEET OF WRAPPING

CROSS REFERENCE TO RELATED APPLICATION(S)

This application claims priority to Luxembourgian Application No. 101585, filed Dec. 30, 2019. The entirety of the disclosure of the above-referenced application is incorporated herein by reference.

TEXT OF THE DESCRIPTION

The present invention relates to a method for producing a shaped sheet of wrapping.

In particular, the method described herein is suitable for the production of a shaped sheet having a hollow portion configured for receiving a product, for example a foodstuff product.

The applications of specific interest herein regard methods in which the sheet of wrapping is subjected to a process of forming substantially without any plastic deformation due to stretching.

Commonly, according to the above methods, the sheet of wrapping is inserted into a forming cavity and is set up against the surfaces of the cavity in such a way as to assume a conformation corresponding to that of the cavity.

Forming processes of the type referred to are usually carried out in cold conditions, i.e., without heating the sheet of wrapping, and on sheets of wrapping that comprise at least one metal layer, for example a layer of aluminum foil.

Following upon the forming step, known processes envisage a cutting step for cutting the sheet of wrapping along a pre-set profile.

Even today, the cutting operation in question is performed, in the vast majority of cases, using exclusively mechanical means such as, in particular, dinking tools of various types and, more in general, cutting blades.

In general, in the industrial packaging sector alternative cutting methods are also known that envisage use of a laser beam.

It may be noted that laser cutting presents various advantages over mechanical solutions. For instance, any variation of the cut to be made simply requires a new setting of the machine and not, instead, a replacement of tools as in the case of mechanical solutions. Moreover, there are no tools that are subject to phenomena of wear for which continuous programmed replacements are necessary.

Notwithstanding the above advantages, mechanical solutions for cutting sheets of wrapping continue to be preferred over laser solutions.

With specific reference to the methods of interest herein for the production of a shaped sheet of wrapping, mechanical solutions are appreciated in so far as they guarantee high speeds, optimal execution of the cutting process, and preservation of the surface finish of the sheet.

In this context, the present invention proposes a method for producing a shaped sheet of wrapping, which envisages an operation of laser cutting of the sheet according to a modality that is such as to obtain markedly superior results as compared to known modalities.

In particular, the present invention relates to a method having the characteristics recalled in claim 1.

Further characteristics and advantages of the invention will emerge clearly from the ensuing description with reference to the annexed drawings, which are provided purely by way of non-limiting example and in which:

FIGS. 1A, 1B, 1C, and 1D represent successive steps of the method described herein, according to an example of embodiment;

FIG. 2 is a schematic illustration of an example of embodiment of the cutting operation according to the method described herein;

FIG. 3 represents a cross-sectional view of a sheet of wrapping, as well as the modality of execution of the cut according to the example of FIG. 2;

In the ensuing description, various specific details are illustrated, aimed at enabling an in-depth understanding of the embodiments. The embodiments may be provided without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

Figure 4:
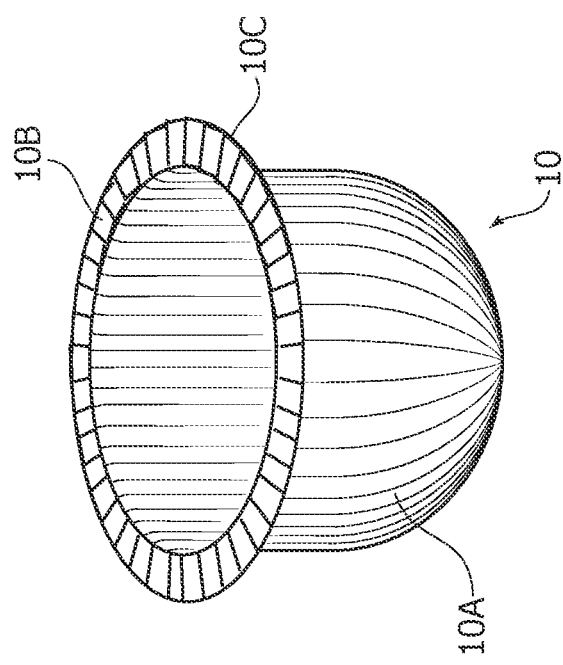
FIG. 4 illustrates an example of a shaped sheet of wrapping obtained applying the method described herein.
Figure 5:
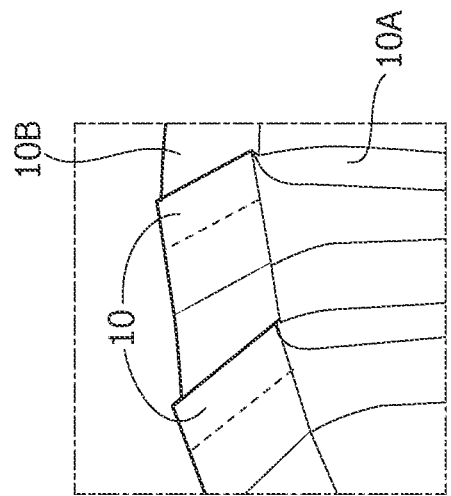
FIG. 5 illustrates a detail of the sheet of wrapping of FIG. 4.

As anticipated above, the method described herein regards production of a shaped sheet of wrapping. With reference to FIG. 4, in particular, the method described herein is suitable for producing a sheet of wrapping 10 having a hollow portion 10A for receiving a product, for example a foodstuff product, and a perimetral edge 100, which extends along a pre-set profile K. In preferred embodiments, as in the one illustrated, the sheet 10 may comprise a substantially planar perimetral flange 10B, which surrounds the hollow portion 10A and defines the perimetral edge 100.

With reference to the example of FIG. 1, the method described herein comprises the steps of:

laying a sheet of wrapping 100 on a treatment surface 50 having a forming cavity 50A;

forming the sheet of wrapping 100 within the forming cavity 50A so as to produce the hollow portion 10A; and cutting the sheet of wrapping 100 along the pre-set profile K so as to produce the perimetral edge 100.

Preferably, the sheet of wrapping 100 comprises at least one layer made of metal material, for example aluminum.

In particular, the sheet of wrapping 100 may be formed by a sheet of aluminum foil coated, on the outer side (with reference to the arrangement in the final package), with a layer of ink, which bestows on the outer surface of the sheet with a pre-set colouring, and/or decoration, and/or image. Possibly, the opposite side, the inner surface (with reference to the arrangement in the final package), may be coated with a layer of heat-sealing material. The sheet of aluminum foil may have a thickness comprised between 1 and 500 µm, possibly between 3 and 300 µm and optionally between 5 and 50 µm (1 µm=1·10-6 m). Alternatively, the sheet of wrapping 100 may have a multi-layered structure comprising at least one layer of polymeric material. For instance, the sheet of wrapping 100 may be formed by a sheet having a multi-layered laminar structure made up of a plurality of layers of polymeric material. Preferred polymeric materials are, for example, polypropylene, polyethylene, polyester, polyamide, etc. A sheet of plastic material suitable for the application in question may generally have a thickness of less than 140 µm, in particular equal to or less than 50 µm. The sheet 100 may also comprise heat-sealing material, such as a heat-sealing lacquer.

In some embodiments, the sheet 100 may present a multi-layered structure comprising at least one layer of polymeric material in combination with a metal layer. For instance, the sheet 100 may consist of a sheet of metallised plastic material (e.g., polypropylene—PP), with a thickness of the metal coating comprised between 10 and 500 Å (1 Å=1·10$^{-10}$ m).

In general, in the method described herein, the forming step envisages forming the sheet 100 substantially without subjecting it to any plastic deformation by stretching.

Figure 1A:
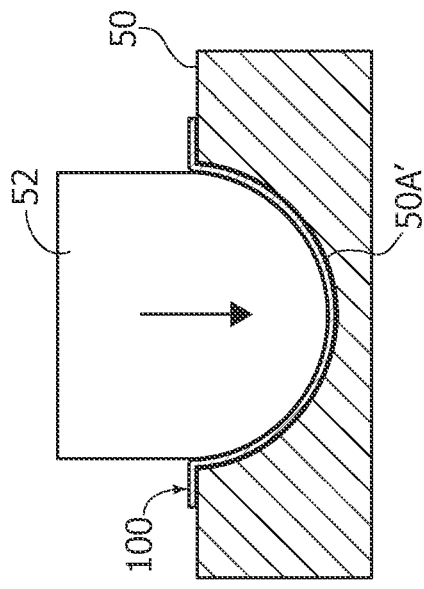
Figure 1B:
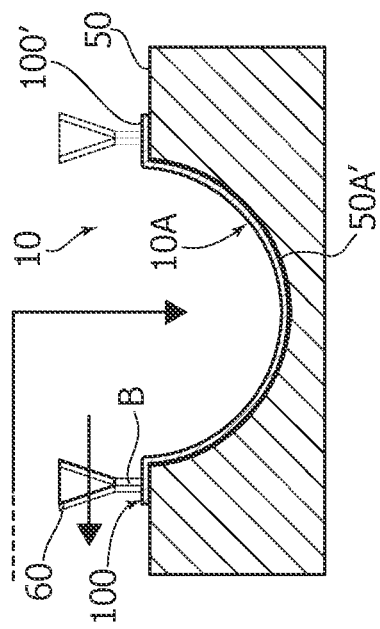
Figure 1C:
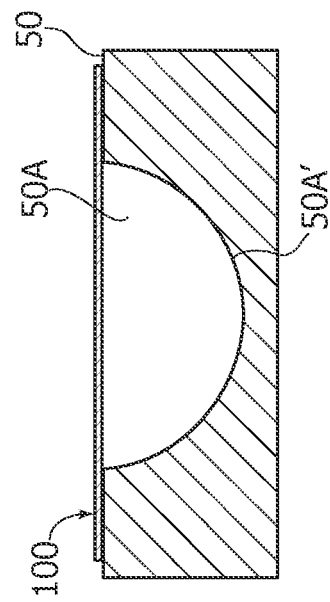
Figure 1D:
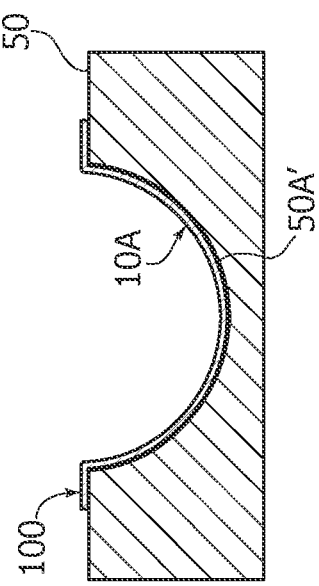

With reference to FIGS. 1A and 1B, the forming step envisages:
 laying the sheet of wrapping 100 on the treatment surface 50 and over the forming cavity 50A;
 introducing a forming member 52 into the forming cavity 50A pushing the sheet of wrapping 100 into the cavity 50A and laying it against the surface 50A' of the cavity.

At the end of the above step, the sheet 100 assumes a conformation corresponding to that of the surface 50A', for the portion thereof that has been inserted into the cavity 50A; this portion identifies the hollow portion 10A.

The forming step can be carried out in cold conditions, i.e., without any application of heat to the sheet of wrapping. Alternatively, the sheet of wrapping may be heated so as to favour deformation thereof into the conformation envisaged for the hollow portion 10A.

The forming step generates a plurality of folds 110 in the sheet of wrapping 100.

The folds in question are generated by the fact that the forming step is obtained substantially in the absence of any deformation due stretching the sheet, simply as a result of repositioning thereof from the arrangement where it is laid out flat, illustrated in FIG. 1A, to the arrangement imposed by the forming cavity 50A, illustrated FIG. 1B.

The folds 110 are defined by folding lines oriented in a transverse direction with respect to the border in plan view of the hollow portion 10A, and are each constituted by at least two flaps set on top of one another and in mutual contact, connected together by the respective folding line. The fold 110 itself is in turn in contact, through one of its two flaps, with an underlying layer of the sheet of wrapping 100. At each fold 110 there may hence be three or more layers of the material laid on top of one another.

It should moreover be noted that, in certain applications, in particular where the use of a sheet of wrapping made of plastic material is envisaged, the forming operation may be carried out according to the teachings of the patent application No. PCT WO2018/146577A1, filed in the name of the present applicant, which envisages sealing the folds referred to above in order to fix the sheet in the conformation assumed within the forming cavity.

In some applications, it will in any case also be possible to envisage a slight deformation of the sheet by stretching, if necessary.

As anticipated above, the method described herein envisages a cutting operation that uses a laser beam B for cutting the sheet of wrapping 100 along the pre-set profile K.

The cutting operation may be performed via a processing head 60 provided with a laser source of a conventional type, suited for carrying out the functions that will be described hereinafter. The laser source may, for example, be a fibre laser, a YAG laser, or a CO$_2$ laser, and may be either a laser of a pulsed type or a continuous-emission laser. Working parameters of the processing head 60, such as the wavelength of the laser beam or else the focal distance, may be selected, according to the common criteria known for laser machining, on the basis of the requirements of the specific applications.

In general, as is known, laser cutting envisages directing the laser beam onto the sheet of wrapping, and orienting it in a continuous way so that its point of incidence on the sheet moves along the given profile envisaged for the edge to be obtained.

The energy conveyed by the laser beam on the sheet causes, in the point of incidence, a phenomenon of sublimation such that the material involved passes directly from the solid state to the aeriform state.

According to the method described herein, the cutting operation envisages carrying out a plurality of passes of the laser beam along the pre-set profile K, which comprise:
 a first pass of the laser beam that follows a first path P1; and
 at least one further pass that follows a further path Pn, which is shifted, with respect to the first path P1, in a direction away from the pre-set profile K.

The further pass or passes of the laser beam has/have the function of eliminating the material of the sheet of wrapping 100 that, at the end of the first pass, still connects the shaped sheet 10 containing the hollow portion 10A with the residual portion 100' of the sheet 100.

The material mentioned is, in particular, constituted by hidden layers of the sheet that emerge only after the first pass of the laser beam.

Prevalently, this occurs at the folds 110 referred to above, where there may be, as mentioned, three or more layers of material set on top of one another.

The first pass of the laser beam will operate on the top layer, whereas the subsequent passes will operate on the underlying layers.

Each further pass of the laser beam follows a respective path that does not coincide with the path followed in the previous pass, but is slightly shifted therefrom in a direction away from the pre-set profile K.

Preferably, this displacement amounts to a distance smaller than or equal to the diameter of the laser beam.

In particular, according to preferred embodiments, the cutting operation includes a number n of further passes of the laser beam, which follow a number n of respective further paths, shifted from the path of the previous pass, away from the pre-set profile K, by respective distances dn corresponding to respective fractions of the diameter of the laser beam. The sum of the distances dn is less than the diameter of the laser beam.

The number n of passes may, for example, be comprised between 2 and 10. The distances dn may be equal to or less than 50% of the diameter of the laser beam.

It should be noted that the laser beam operates with working parameters, in particular an operating power, which are such that, in each individual pass, the beam is able to act only on one layer of the sheet.

In preferred embodiments, the power of the laser beam is less than 500 W.

With reference now to FIGS. 2 and 3, these illustrate an example of operation of cutting of the sheet 100, on which the hollow portion 10A has already been formed, along the pre-set profile K.

The operation illustrated envisages three successive passes of the laser beam along the pre-set profile K that follow respective paths P1, P2, P3, positioned at an ever-increasing distance, starting from the first pass to the third pass, from the pre-set profile K (FIG. 3).

The paths P1, P2, P3 represented identify the positions assumed by the centre of the laser beam (with reference to a section of the beam) during movement of the beam along the profile K.

The path P1 of the first pass extends in such a way that the laser beam is tangential to the pre-set profile K and so remains throughout the path along the profile K.

The path P2 extends in a direction parallel to the path P1 and is shifted therefrom by a distance d1 equal to half the diameter of the laser beam. This distance is maintained throughout the length of the path along the profile K.

Likewise, the path P3 extends parallel to the path P2 and is positioned even further away from the path P1. In particular, the path P3 is positioned at a distance d2 from the path P2, which is equal to one quarter of the diameter of the laser beam. This distance is maintained throughout the length of the path. The values of the distances d1 and d2 are provided purely by way of example.

It may be noted that, since the distances d1 and d2 are less than the diameter of the laser beam, and thus also their sum, the different passes of the laser beam have areas of intersection between the respective areas A1, A2, A3 covered thereby (FIG. 3). In particular, a region of intersection A' is identified that is common to all three areas covered by the three passes of the laser beam.

With reference now to FIG. 3, this shows the action performed by the laser beam during the individual passes, in a region of the sheet 100 present in which is a fold 110 and, as a consequence, three layers 101, 102, 103 are set on top of one another.

Once again in FIG. 3, the hatched boxes appearing on the various layers of the sheet represent portions of these layers that are progressively eliminated following upon the various passes of the laser beam.

As represented in FIG. 3, the first pass along the path P1 causes elimination of the portion 101I of the first layer 101.

The second pass along the path P2 in turn causes elimination of the portion 102I of the second layer 102, in the area of intersection between the area A1 covered in the first pass and the area A2 covered in the second pass, and moreover elimination of the portion 101II of the first layer 101 in the remaining region of the area A2 covered by the second pass.

Finally, the third pass along the path P3 brings about:
elimination of the portion 1031 of the third layer 103 in the region of intersection A' common to the three areas A1, A2, and A3 covered by the three passes of the laser beam;
elimination of the portion 102II of the second layer 102 in the region of intersection between the area A2 covered by the second pass and the area A1 covered by the first pass; and
elimination of the portion 101III of the first layer 101 for the remaining region of the area covered by the third pass.

In the region A', the material of all three layers 101, 102, and 103 has been eliminated, and complete cutting of the sheet 100 has hence been obtained. In the example illustrated, each pass of the laser beam eliminates exactly one layer of the sheet. This choice has been made to facilitate understanding of the solution. It will be clear to the person skilled in the sector that the individual passes may also eliminate just a part of a single layer of the sheet or else eliminate an entire layer plus a part of the underlying layer, according to the requirements of the individual applications. In any case, complete cutting of the sheet is obtained only after execution of multiple passes of the laser beam, in the way described above.

In view of the foregoing, it should now be noted that the present applicant has been able to verify that execution of laser cutting of the sheet of wrapping in the way referred to makes it possible to guarantee complete cutting of the sheet and at the same time preserve the surface characteristics of the sheet also along the edge 100 that is obtained from the cutting operation.

This can be attributed to the fact that the laser beam is made to operate at a contained power, as a result of which the multiple passes referred to above are necessary, as well as to the fact that these passes are not performed along one and the same path, but along distinct paths.

For the reasons referred to above, the method described herein proves particularly advantageous for applications with printed sheets of wrapping (i.e., sheets coated with a layer of ink) in so far as it becomes possible to preserve the printing layer also along the perimetral edge of the sheet, obtained from cutting, thus considerably enhancing the quality of the final package.

In applications in which the sheet of wrapping 100 has, in combination, a layer of polymeric material and a layer of metal material, the cutting step may envisage the use of two laser beams, characterised by different wavelengths, one for treatment of the layer of polymeric material and the other for treatment of the metal layer. For instance, it is possible to use a $CO_2$ laser source for treatment of the layer of polymeric material, and a fibre laser or a YAG laser for treatment of the metal layer.

Preferred modes of use of the two laser beams are described in the patent application No. EP 3523084A1, filed in the name of the present applicant.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. A method for producing a shaped sheet of wrapping (10), comprising a hollow portion (10A) and a perimetral edge (10C) that extends along a pre-set profile (K), said method comprising the steps of:
laying a sheet of wrapping (100) on a treatment surface (50) having a forming cavity (50A); and
forming said sheet of wrapping (100) within said forming cavity (50A) so as to reproduce a shape of said hollow portion (10A) thereon,
wherein said forming step includes an action of insertion of said sheet of wrapping (100) into said forming cavity (50A), without subjecting said sheet of wrapping (100) to deformation by stretching at least for a phase of said action of insertion, said formed sheet (100) having a plurality of folds (110) consisting of two or more layers set on top of and in contact with one another of said sheet of wrapping (100);
cutting said formed sheet of wrapping (100) along said pre-set profile (K) for producing said perimetral edge (10C) and obtaining said shaped sheet of wrapping (10);
wherein said step of cutting said formed sheet of wrapping (100) along said pre-set profile (K) comprises the use of a laser source (60) designed to emit a laser beam (B), and includes applying said laser beam (B) on said formed sheet (100) and orienting said laser beam so as to carry out a plurality of passes of said laser beam along said pre-set profile (K), wherein said plurality of passes comprises:

a first pass of said laser beam that follows a first path (P1), wherein following said first path (P1) comprises moving the center of said laser beam to different positions along said first path (P1); and at least one further pass of said laser beam that follows a further path (P2, P3, . . . , Pn) different from said first path (P1) and that is shifted from said first path (P1), in a direction away from said pre-set profile (K), by a given distance (d1, d2) such that the laser beam that follows said further path (P2, P3, . . . , Pn) can operate on an underlying layer of the formed sheet (100) that still connects said shaped sheet (10) to a residual portion (100') of said sheet of wrapping (100) and that emerges on a side where the laser source is located as a result of said first pass of said laser beam, wherein following said further path (P2, P3, . . . , Pn) comprises moving the center of said laser beam to different positions along said further path (P2, P3, . . . , Pn).

2. The method according to claim 1, wherein said distance (d1, d2) is smaller than or equal to the diameter of said laser beam.

3. The method according to claim 1, wherein said at least one further pass includes a number n of passes that follow a number n of respective paths (P2, P3, . . . , Pn) shifted with respect to the path of the previous pass, in a direction away from said pre-set profile (K), by respective distances (d1, d2, dn) corresponding to respective fractions of the diameter of said laser beam, where the sum of said distances (d1, d2, dn) of said n further passes is less than the diameter of said laser beam.

4. The method according to claim 1, wherein inserting said sheet of wrapping (100) into said forming cavity includes:
   providing a forming member (52), which is to co-operate with said forming cavity (50A);
   laying said sheet of wrapping (100) on said treatment surface (50) and over said forming cavity (50A); and
   bringing said forming member (52) into said forming cavity (50A), pushing said sheet of wrapping (100) into said cavity (50A) by means of said member (52).

5. The method according to claim 1, wherein said shaped sheet (10) comprises a peripheral flange (10B) that extends around said hollow portion (10A) and defines said perimetral edge (10C), wherein said cutting step includes orienting said laser beam along said pre-set profile (K) that is located at said given distance from said hollow portion (10A) so as to produce said peripheral flange (10B).

6. The method according to claim 1, wherein said sheet of wrapping (100) comprises at least one layer of metal material.

7. The method according to claim 6, wherein one side of said sheet is coated with a layer of ink.

8. The method according to claim 7, wherein the opposite side of said sheet is coated with a layer of heat-sealing material.

9. The method according to claim 1, wherein said sheet of wrapping (100) has a multi-layered structure comprising at least one layer of polymeric material.

10. The method according to claim 9, wherein said sheet of wrapping comprises a heat-sealing layer.

11. The method according to claim 9, wherein said sheet of wrapping (100) has a multi-layered structure comprising a layer of polymeric material in combination with a metal layer.

12. The method according to claim 11, wherein said cutting step comprises applying said laser beam on said metal layer, and applying a further laser beam, of different wavelength, on said layer of polymeric material.

13. The method according to claim 6, wherein said metal material comprises aluminum.

14. The method according to claim 10, wherein said heat-sealing layer comprises a heat-sealing lacquer.

15. The method according to claim 1, wherein said laser source (60) is a pulsed-type laser.

16. The method according to claim 1, wherein said laser source (60) is a continuous-emission laser.

* * * * *